United States Patent
Sawada et al.

(10) Patent No.: US 7,401,813 B2
(45) Date of Patent: Jul. 22, 2008

(54) STEERING APPARATUS FOR MOTOR VEHICLE

(75) Inventors: Naoki Sawada, Gunma-ken (JP); Yuichi Tomaru, Gunma-ken (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 163 days.

(21) Appl. No.: 10/550,712

(22) PCT Filed: Mar. 17, 2004

(86) PCT No.: PCT/JP2004/003515

§ 371 (c)(1),
(2), (4) Date: Sep. 26, 2005

(87) PCT Pub. No.: WO2004/085225

PCT Pub. Date: Oct. 7, 2004

(65) Prior Publication Data

US 2006/0214410 A1   Sep. 28, 2006

(30) Foreign Application Priority Data

Mar. 26, 2003   (JP) .............................. 2003-085692

(51) Int. Cl.
*B62D 1/18* (2006.01)
(52) U.S. Cl. ...................................... 280/775
(58) Field of Classification Search ................ 280/775, 280/777; 74/493
See application file for complete search history.

(56) References Cited

U.S. PATENT DOCUMENTS

| | | | |
|---|---|---|---|
| 5,009,121 A * | 4/1991 | Matsumoto et al. | 74/493 |
| 5,377,555 A | 1/1995 | Hancock | 74/493 |
| 6,036,228 A | 3/2000 | Olgren et al. | |
| 6,282,978 B1 | 9/2001 | Kurita | 74/493 |
| 6,467,807 B2 | 10/2002 | Ikeda et al. | 280/775 |
| 6,623,036 B2 * | 9/2003 | Yamamura et al. | 280/775 |
| 7,219,926 B2 * | 5/2007 | Ikeda et al. | 280/775 |

FOREIGN PATENT DOCUMENTS

| | | |
|---|---|---|
| EP | 1 125 820 A2 | 8/2001 |
| GB | 2 116 496 A | 9/1983 |
| JP | UM-3-121971 | 12/1991 |
| JP | UM-3-124985 | 12/1991 |
| JP | 6-219283 | 8/1994 |
| JP | 8-80857 A | 3/1996 |
| JP | 2000-118415 | 4/2000 |
| JP | 2001-347953 | 12/2001 |
| JP | 2002-87285 | 3/2002 |
| JP | 2002-120731 | 4/2002 |

* cited by examiner

*Primary Examiner*—Christopher Ellis
*Assistant Examiner*—Robert A. Coker
(74) *Attorney, Agent, or Firm*—Miles & Stockbridge PC

(57) ABSTRACT

In a steering apparatus for a vehicle in which an inner column is supported to be movable in the axial direction by an outer jacket supported by a body-side bracket and a steering shaft is fixed to an adjustment position by clamping the inner column by the use of telescopic clamping means through the outer jacket, the outer jacket is provided with a slit entirely along the axial direction thereof.

19 Claims, 16 Drawing Sheets

STEERING APPARATUS FOR MOTOR VEHICLE

TECHNICAL FIELD

The present invention relates to a steering apparatus of a tilt and/or telescopic scheme for a vehicle.

BACKGROUND ART

In Japanese Patent Application Laid-Open No. 2001-347953, in a steering apparatus of a tilt and/or telescopic scheme for a vehicle, an upper-side inner column is slidably fitted in a lower-side outer jacket fixed to the vehicle body. It is arranged such that the lower-side outer jacket and the upper-side inner column can be tilted together and the upper-side inner column can telescopically slide with respect to the lower-side outer jacket fixed to the vehicle body.

The lower-side outer jacket has a pair of clamp portions which are fixed to a part thereof at the rear side of the vehicle. At the time of tilt and/or telescopic clamping, these paired clamp portions are caused to approach each other so as to embrace the upper-side inner column to be fixed by clamping.

Further, since it is necessary to prevent the upper-side inner column from rotating with respect to the lower-side outer jacket fixed to the vehicle body, and also to provide a stopper for telescopic adjustment, a projection or a bolt formed on the lower-side outer jacket is engaged with an axial groove which is formed on the upper-side inner column in a part on a more frontal side of the vehicle than the clamp portions.

In Japanese Patent Application Laid-Open No. 6-219283, in a telescopic type steering apparatus for a vehicle, an upper surface having a substantially M shape of a distance bracket which has grooves extended in the axial diction for telescopic adjustment on both sides thereof is attached to a lower side of a steering column by welding. The steering column is arranged to be telescopically slidable, together with the distance bracket, with respect to a body-side bracket. At telescopic clamping, the steering column can be fixed by clamping a clamping bolt which is inserted through the grooves for telescopic adjustment of the distance bracket to thereby press the distance bracket on the body-side bracket with pressure.

Further, the distance bracket and the body-side bracket are in pressure contact with each other at flat surfaces thereof, so as to serve to prevent rotation of the steering column. At the same time, the clamping bolt is passed through the grooves for telescopic adjustment of the distance bracket so as to play the role of a stopper for a telescopic adjustment.

Also, in Japanese Patent Application Laid-Open No. 2000-118415, in a tilt-type steering apparatus for a vehicle, a distance bracket is attached to a steering column. The distance bracket is provided with a pair of flanges which are extended along the sides of the steering column and which are interposed between a pair of vehicle body side-brackets formed with grooves for tilt adjustment. The steering column is arranged to be tiltable with respect to the body-side brackets, together with the distance bracket. At tilt clamping, it is arranged such that the steering column can be fixed by clamping a clamping bolt which is inserted through the grooves for tilt adjustment of the body-side brackets to thereby press the distance bracket on the body-side bracket with pressure.

Generally, in case of a steering column in which a distance between a steering wheel and a steering gear mechanism is short or a steering column in which a collision stroke has to be set at great, it is difficult to securely obtain both a stroke for telescopic adjustment and the collision stroke, in order to establish a telescopic adjustment structure.

To cope with a request for maintaining the steering column with a high rigidity, as disclosed in Japanese Patent Application Laid-Open No. 2001-347953, such a structure is effective as that an inner column is clamped by a pair of clamp portions, which requires high precision of the outer periphery of the inner column and of the inner diameter of an outer jacket in order to avoid very small backlash in case with a high rigidity (particularly with high oscillation rigidity), but can be processed comparatively easily because of a circular section thereof.

However, in the structure disclosed in Japanese Patent Application Laid-Open No. 2001-347953, it is required to separately provide a structure for preventing rotation of the inner column at a position different from that of the clamp portion.

Also, in case of a short steering column, it is difficult to secure a position at which the structure for preventing rotation of the inner column is provided. It can be considered that an axial groove is formed on the inner column side in the clamp portion to cope with this problem. However, the formation of the axial groove of the inner column may result in that the inner column is easily flexed at clamping to thereby deteriorate the retaining rigidity.

Further, when an axial groove is plastically processed on an inner column in the form of a thin pipe as a deformed cross-section thereof, it is difficult to secure a dimensional accuracy, which may results in problems such as a defective telescopic operation or backlash sensed in operation. Further, when a plate for preventing rotation is fixed by welding, the inner column may be deformed by welding to bring about telescopical defective operation.

Further, in Japanese Patent Application Laid-Open No. 2001-347953, axial slits are provided on the outer jacket at portions at which the pair of clamp portions are formed. However, no other slit is provided on the outer jacket which is therefore formed cylindrical except the above portions. The other part is formed to be cylindrical. Since the outer jacket and the inner column are telescopically slidable, a gap is inevitably required therebetween. Further, since the steering shaft has to slid telescopically, a gap is required also inside the outer jacket. As a result, backlash feeling may be caused in steering, and the retaining force of the outer jacket may be deteriorated.

Further, as disclosed in Japanese Patent Application Laid-Open No. 6-219283, in the telescopic structure in which an upper side of the distance bracket is attached to a lower side of the steering column by welding, moments are generated on a body attaching surface, the clamp portions and the center of the inner column (the center of the steering wheel), respectively, which is disadvantageous in terms of the rigidity.

Further, a structure as disclosed in Japanese Patent Application Laid-Open No. 2000-118415 in which a pair of flanges of the distance bracket extended along the sides of the steering column are interposed between a pair of vehicle body side brackets, is effective in terms of the rigidity. However, in such a structure, if it is arranged to be telescopic type, the number of the constituent parts may be increased.

SUMMARY OF THE INVENTION

In view of such circumstances as described above, an object of the present invention is to provide a steering apparatus for a vehicle which is capable of maintaining a high rigidity of a steering column while reducing the number of the constituent parts.

In order to achieve the above object, according to the present invention, there is provided a steering apparatus for a vehicle in which an inner column is supported to be movable in the axial direction by an outer jacket supported by a vehicle body-side bracket, and a steering shaft is fixed to an adjustment position by clamping the inner column through the outer jacket by means of clamping means, characterized in that:

the outer jacket is provided with slits along the entire length in the axial direction thereof.

As described above, according to the present invention, the whole outer jacket can be flexed easily at fixing and the retaining force has no gradient in the axial direction. As a result, the retaining force can be enhanced.

Further, it is no longer required to weld the inner column to the distance bracket since there is no other distance bracket. For this reason, a telescopic operation becomes comparatively satisfactory so that the steering column can be maintained with a high rigidity while reducing the number of the constituent parts.

Also, the steering apparatus for a vehicle according to the present invention can be arranged such that the steering shaft is supported to be rotatable at least two points inside the inner column, and the steering shaft is positioned outside the inner column and is extended and/or contracted on the lower side thereof. With this arrangement, the steering shaft does not telescopically slide inside the inner column so that backlash feeling sensed on the steering wheel can be reduced.

Further, the steering apparatus for a vehicle according to the present invention can be arranged such that the inner column is expanded to a non-circular deformed form and the inner diameter portion of the outer jacket can take a non-circular deformed form correspondingly. With this arrangement, the main body of the inner column can be provided with the function of preventing rotation, and the retaining force at telescopic clamping, or the like, can be enhanced.

Further, in the steering apparatus for a vehicle according to the present invention, the inner column can be provided with a member for an axial stopper for preventing rotation which is extended from the inner column through the slits. With this arrangement, it is possible to discharge the function of preventing rotation of the inner column and also the function of the stopper at telescopic sliding.

EMBODIMENT OF THE INVENTION

A steering apparatus for a vehicle according to an embodiment of the present invention will be described below with reference to drawings.

First Embodiment

Figure 1:
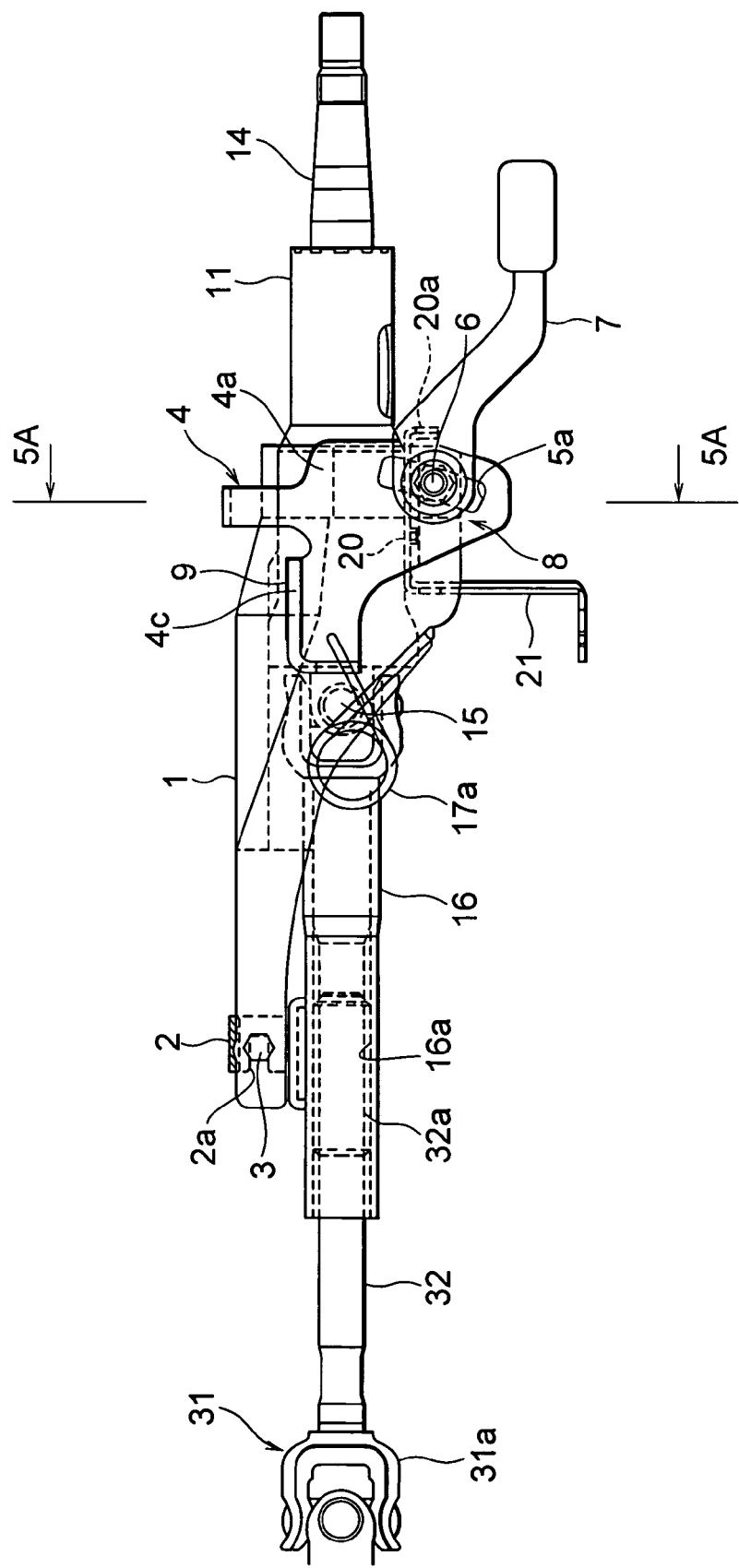
FIG. 1 is a side view of a tilt and/or telescopic type steering apparatus for a vehicle according to a first embodiment of the present invention.
Figure 2:
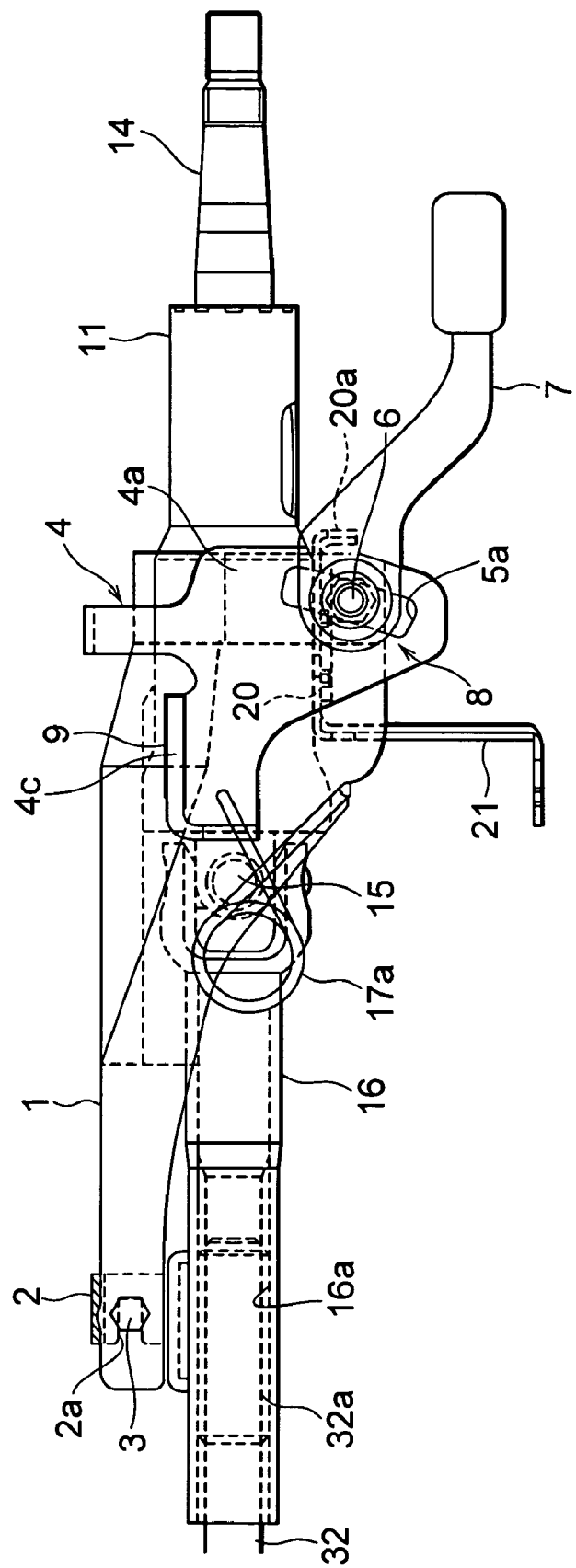
FIG. 2 is a side view of an essential portion of the tilt and/or telescopic type steering apparatus for a vehicle shown in FIG. 1.

FIG. 1 is a side view of a tilt and/or telescopic type steering apparatus for a vehicle according to a first embodiment of the present invention. FIG. 2 is a side view of an essential portion of the tilt and/or telescopic type steering apparatus for a vehicle shown in FIG. 1.

Figure 3:
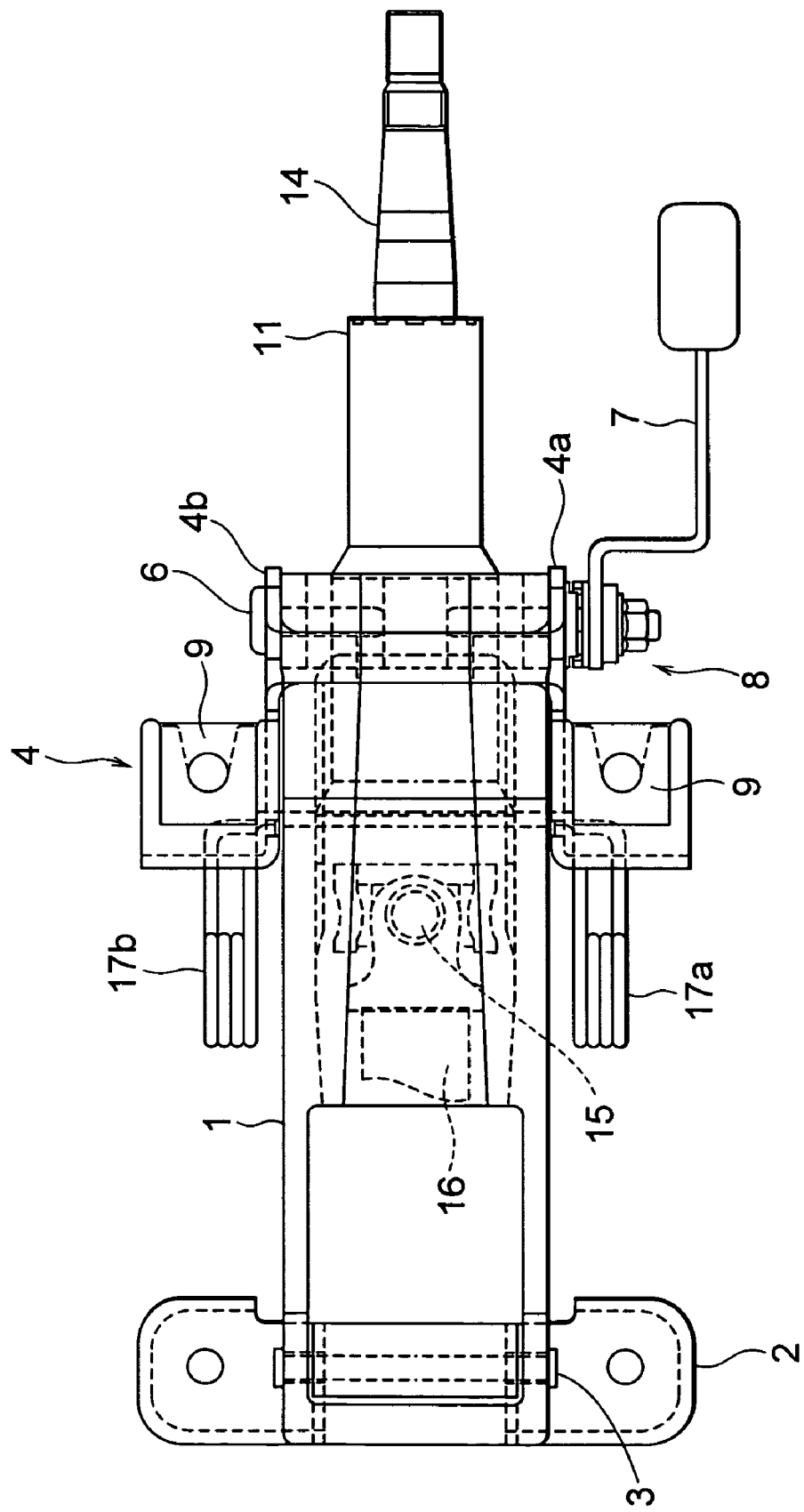
FIG. 3 is a plan view of the tilt and/or telescopic steering apparatus type for a vehicle shown in FIG. 1.
Figure 4:
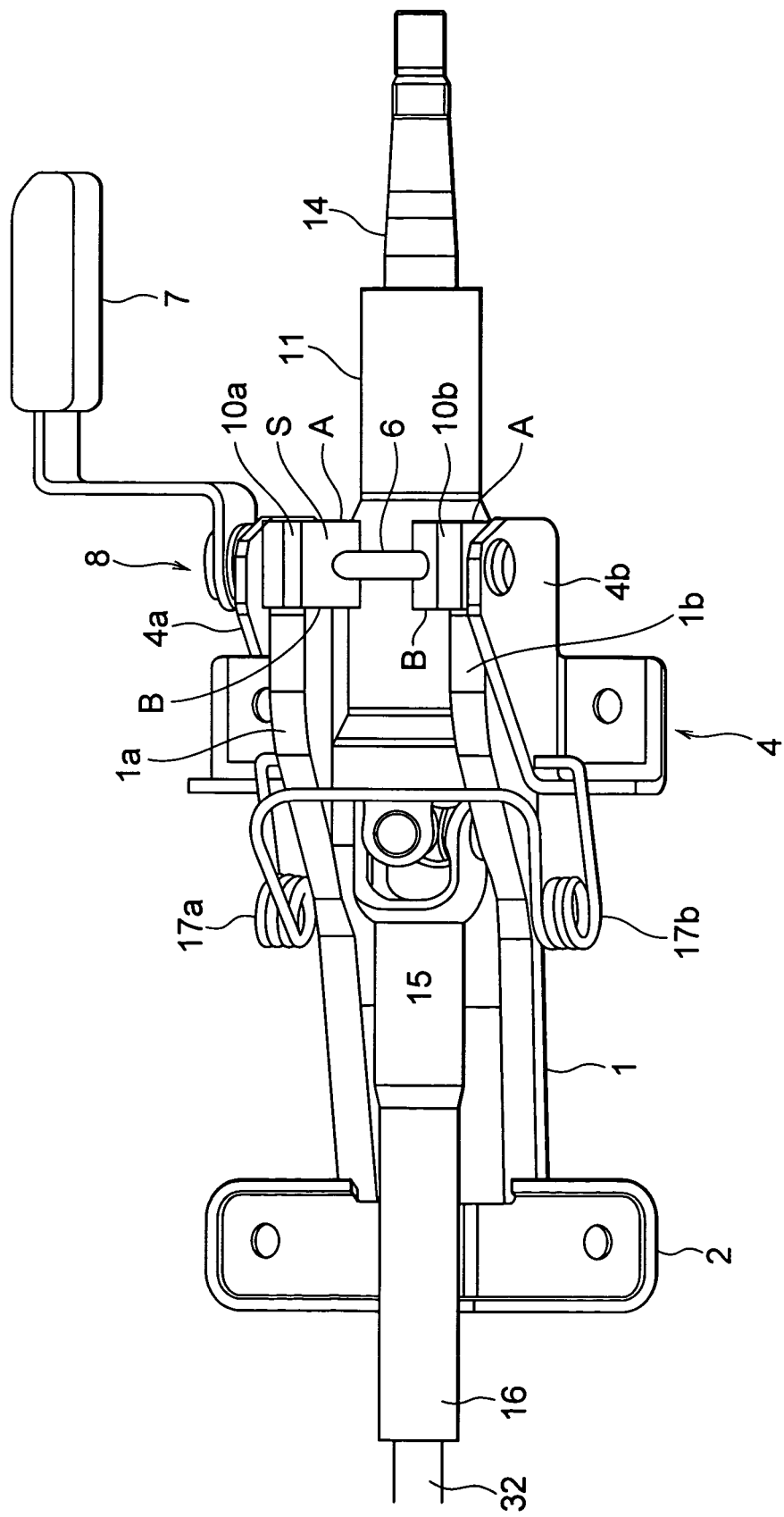
FIG. 4 is a view of the tilt and/or telescopic type steering apparatus for a vehicle shown in FIG. 1, seen from diagonally below.

FIG. 3 is a plan view of the tilt and/or telescopic type steering apparatus for a vehicle shown in FIG. 1. FIG. 4 is a view of the tilt and/or telescopic type steering apparatus for a vehicle shown in FIG. 1, seen from diagonally below.

Figure 5A:
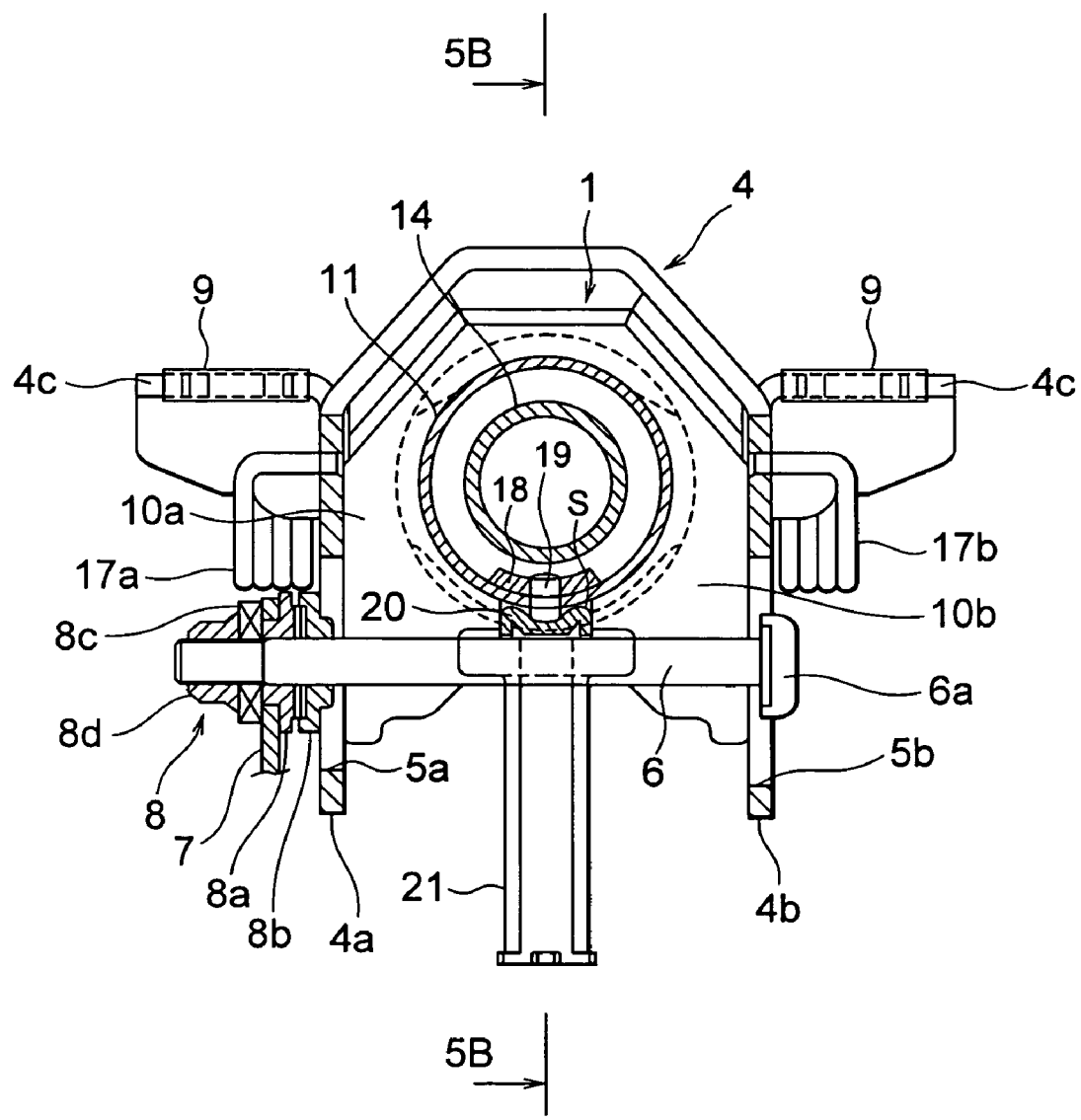
FIG. 5A is a transverse sectional view of the tilt and/or telescopic type steering apparatus for a vehicle shown in FIG. 1, taken along line 5A-5A.
Figure 5B:
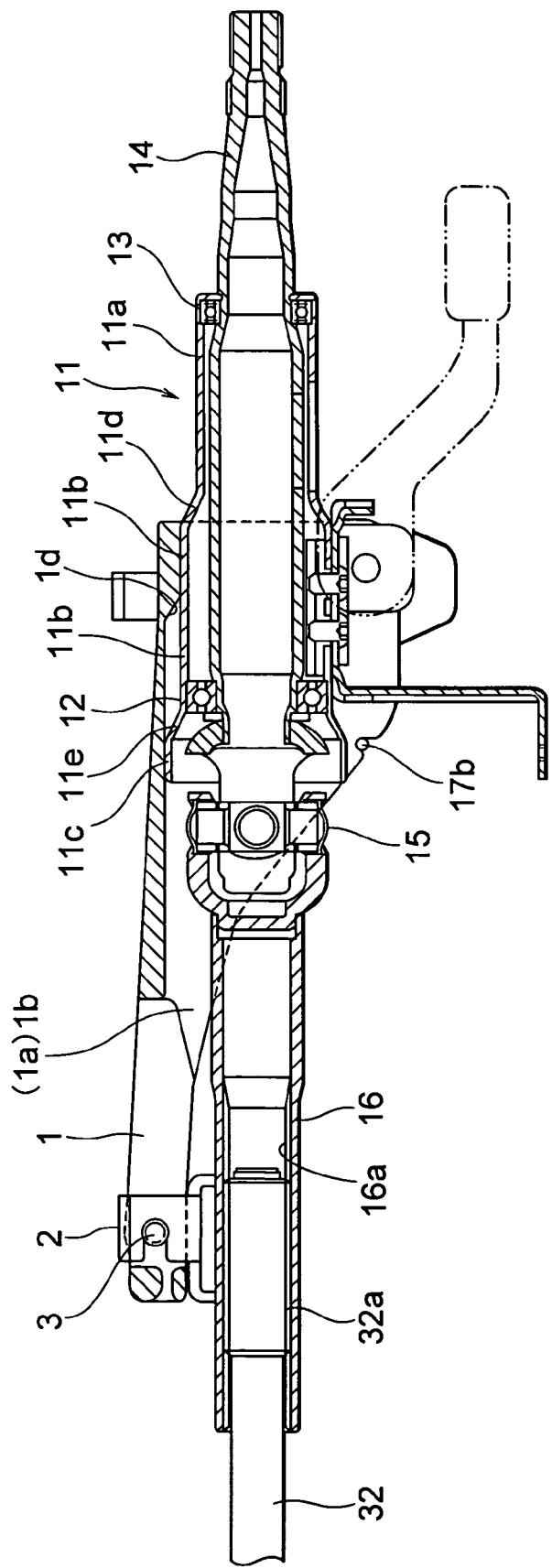
FIG. 5B is a transverse sectional view taken along line 5B-5B of FIG. 5A.

FIG. 5A is a transverse sectional view of the tilt and/or telescopic steering apparatus for a vehicle shown in FIG. 1, taken along line 5A-5A, and FIG. 5B is a transverse sectional view taken along line 5B-5B of FIG. 5A.

Figure 6:
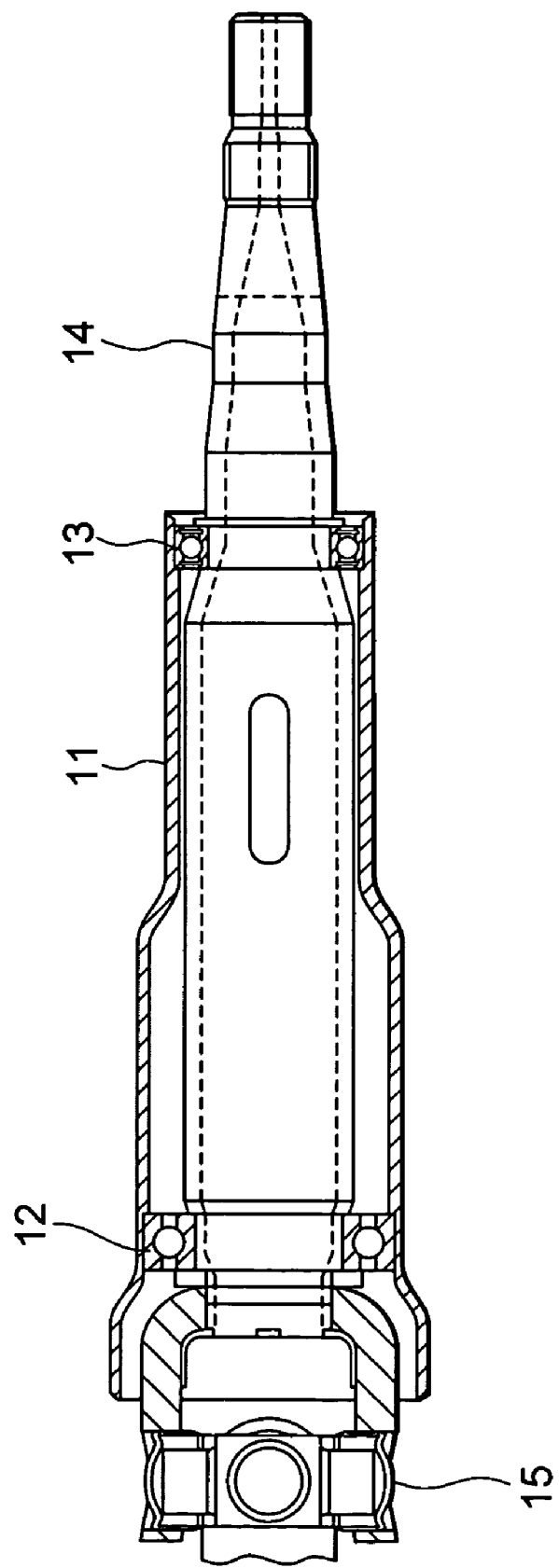
FIG. 6 is a longitudinal sectional view of the steering apparatus in a state that an outer jacket has been removed.

FIG. 6 is a longitudinal sectional view of the steering apparatus in a state that an outer jacket has been removed.

In FIGS. 1 through 3 and FIG. 5B, an upper steering shaft 14 with a steering wheel (not shown) attached to a rear end thereof is supported to be rotatable by an inner column 11 made of aluminum or copper through bearings 12, 13. A lower end of the upper steering shaft 14 is coupled to a lower steering shaft 16 through an universal joint 15. On the front side of the outer jacket 1 with respect to the vehicle body, there is provided a vehicle body-side lower bracket 2 which is fixed to a vehicle body-side strength member, and the frontal end portion of the outer jacket 1 with respect to the vehicle body is connected to this body-side lower bracket 2 by means of a pin 3. With this arrangement, the outer jacket 1 can be tilted around the pin 3, so that the pin 3 is arranged to play the role of a pivot at tilt adjustment. The outer jacket which will be described later is formed of aluminum.

The body-side lower bracket 2 is formed with a notch portion 2a which is engaged with the pin 3 and is open to the frontal side of the vehicle. With this arrangement, at a secondary collision, the pin 3 is moved toward the front part of the vehicle, together with the outer jacket 1, to be removed from the vehicle body.

On the rear side of the outer jacket 1 with respect to the vehicle body, there is provided a vehicle body-side upper bracket 4 which is fixed to the body-side strength member. Both the flanges 4c extended in the horizontal direction of the body-side upper bracket 4 are attached to the body-side strength member through a bent piece 9 for removal from the vehicle body by means of a bolt (not shown). At a secondary collision, the body-side upper bracket 4 can remove from the vehicle body by means of this bent piece 9 for removal from the vehicle body.

As shown in FIG. 5A, the body-side upper bracket 4 integrally comprises a pair of side plate portions 4a, 4b which are extended in an up-and-down direction. These side plate portions 4a, 4b are formed with a pair of elongated holes 5a, 5b for the purpose of tilt adjustment. A clamping bolt 6 is inserted through these elongated holes 5a, 5b for tilt adjustment. This clamping bolt 6 is engaged with the elongated hole 5b at the expanded head portion 6a thereof, so as to be prevented from rotation. A screw portion at the tip end of the clamping bolt 6 is provided with a cam and lock mechanism 8 which is operated by an operational lever 7.

The cam and lock mechanism 8 comprises, as shown in FIG. 5A, a first cam member 8a and a second cam member 8b. The first cam member 8a is fitted on the clamping bolt 6 so as to rotate integrally with the operational lever 7. The second cam member 8b is fitted on the bolt 6 to be movable, and is engaged with the elongated hole 5a for tilt adjustment of the side plate 4a to be movable in an up-and-down direction along this elongated hole 5a and to be non-rotatable by this elongated hole 5a. The second cam member 8b is moved in the axial direction while engaging with a convex part or a concave part of the first cam member 8a upon rotation of the first cam member 8a, thereby effecting locking or releasing the locking. An adjustment nut 8d is fixed to a screw portion of the clamping bolt 6 which is formed outside the cam and lock mechanism 8 through a thrust bearing 8c.

With this arrangement, as shown in FIG. 5A, when the operational lever 7 is rotated for clamping to the tilt or telescopic adjusted position, the second cam member 8b of the cam and lock mechanism 8 is moved to the right in the axial direction and the pair of side plate potions 4a, 4b are caused to approach each other through the clamping bolt 6, thereby clamping clamp portions 10a, 10b which will be described later.

On the other hand, if the operational lever 7 is rotated for releasing the clamping to the tilt or telescopic adjusted position, the second cam member 8b of the cam and lock mechanism 8 is moved to the left in the axial direction and the pair of side plate potions 4a, 4b are caused to approach each other, thereby releasing the clamped state of the clamp portions 10a, 10b which will be described later.

In FIGS. 1 through 5B, the outer jacket 1 is extended in the axial direction of the steering shaft, and integrally comprises side portions 1a, 1b which are extended downward on both sides of the inner column 11 in a saddle-like manner, as shown in FIG. 4. The side portions 1a, 1b are integrally formed with the clamp portions 10a, 10b which support the inner column 11 from the outer peripheral side, at the rear ends thereof. The clamp portions 10a, 10b have outer surfaces which are pressed by the side plate portions 4a, 4b of the outer bracket 4. At the same time, in lower parts inside the clamp portions, a slit S is formed along the direction of the steering shaft to face each other below the inner column 11.

Thus, the outer jacket 1 embraces the inner column 11 from the outer peripheral side by the use of the clamp portions 10a, 10b.

In the present embodiment, the inner column 11 has the minimum diameter at the rear end part 11a thereof, a middle diameter at a middle portion 11b, and the maximum diameter at the front end portion 11c. A first inclined step portion 11d and a second inclined step portion 11e are formed between the rear end portion 11a and the middle portion 11b and between the middle portion 11b and the front end portion 11c, respectively. On the other hand, inside the outer jacket 1, the inner diameter of the clamp portions 10a, 10b at the rear end thereof becomes smaller than the outer diameter of the middle portion 11b of the inner column 11 at the time of clamping so that the outer jacket may be press-fitted onto the middle portion 11b. The inner diameter of the outer jacket 1 is increased from the inclined step portion 1d on the front side thereof to form a gap from the inner column, and is decreased toward the front part to take such a form as press-fitting on the front end portion 11c of the inner column 11 at the time of clamping. With this structure, in a state that the clamp portions 10a, 10b are clamped by the cam and lock mechanism 8, the inner column 11 is pressed and retained by the two inner diameter portions of the outer jacket 1 at the middle portion 11b and the front end portion 11c thereof.

In the present embodiment, the bearings 12 are preferably provided on the forefront side of the middle portion 11b of the inner column 11.

In the present embodiment, when an angle formed by the first inclined step portion 1d of the outer jacket 1 and the axial direction of the steering shaft is A and an angle formed by the second inclined step portion 11e of the inner column 11 and the axial direction of the steering shaft is B, the relationship between A and B is established as A>B. In accordance with this relationship, it is possible to give these inclined step portions with the stopper function in a telescopic sliding of the steering shaft.

The lower steering shaft 16 is, as shown in FIG. 1, formed cylindrical, and the tip end thereof is provided with a female spline portion 16a (or a female serrated portion). A male spline portion 32a (or a male serrated portion) of a yoke shaft 32 which is integrally connected to a yoke 31a of a universal joint 31 on the lower side thereof is fitted in the female spline portion 16a at the tip end of the lower steering shaft 16 to be telescopically slidable. It may be arranged such that the tip end of the lower steering shaft 16a is a male spline and the yoke shaft 32 is a female spline.

As described above, in the present embodiment, the lower steering shaft 16 and the yoke shaft 32 are provided outside the inner column 11 and are arranged to be freely expandable and contractible (telescopically slidable) on the lower side thereof, as shown in FIG. 1. For this reason, since the steering shaft does not telescopically slide inside the inner column 11, backlash feeling felt on the steering wheel can be reduced.

Note that, in FIGS. 1 through 5B, a pair of coil springs 17a, 17b are interposed between a pair of side plate portions 4a, 4b of the body-side upper bracket and the both side portions 1a, 1b of the outer jacket 1. With this arrangement, it is arranged, when the clamped state to the tilt position is released, or the like, to prevent the outer jacket 1 and the inner column 11 from falling.

In FIGS. 4 and 5A, the paired clamp portions 10a, 10b of the outer jacket 1 are provided with a slit S having a predetermined width along the entire axial direction at a lower side thereof.

A reinforcing member 18 is provided on the inner peripheral surface of the inner column 11 which is corresponding to this slit S. An axial stopper member 20 which is extended through the slit S for preventing rotation is fixed to this reinforcing member 18 by a screw 19.

Note that, the axial stopper member 20 for preventing rotation, the screw 19 and a column cover attaching portion 21 are omitted in FIG. 4 for easy understanding.

This axial stopper member 20 for preventing rotation is integrally formed with the column cover attaching portion 21 and is extended downward.

Note that, as shown in FIGS. 1 and 2, the column cover attaching portion 21 and the bent portion 20a of the axial stopper member 20 for preventing rotation on the rear side with respect to the vehicle body are respectively abut upon wall surfaces A and B (FIG. 4) at both ends in the axial direction of the clamp portions 10a, 10b in a telescopic sliding operation, so as to play the role of the axial stopper.

As described above, according to the present embodiment, since the clamp potions 10a, 10b of the outer jacket 1 are provided with the slit S along the entire axial direction, the whole outer jacket 1 is easily flexed at clamping. As a result, the retaining force at the clamping can be enhanced.

Also, since the distance bracket which is conventionally used is no longer required in the present embodiment and the welding between the inner column 11 and the distance bracket is resultantly unnecessary, a telescopic operation becomes comparatively satisfactory, so that the steering column can be maintained at high rigidity while reducing the number of the constituent parts.

Inside the inner column 11, the upper steering shaft 14 is rotatably supported at two bearings 12 and 13. In case of the present embodiment, as shown in FIG. 1, the lower steering shaft 16 and the yoke shaft 32 are provided to be extendable and contractible (telescopically slidable) outside and on a lower side of the inner column 11. For this reason, the steering shaft does not telescopically slide in the inner column 11 so that the backlash feeling felt on the steering wheel can be reduced. As a result, differing from the conventional Japanese Patent Application Laid-Open No. 2001-347953, no backlash feeling can be sensed in steering and the retaining force of the outer jacket can be kept high.

Further, the inner column 11 is provided with the axial stopper member 20 for preventing rotation which is extend to pass through the slit S from the outside of the inner column 11 to the inside of the inner column 11. With this axial stopper member 20 for preventing rotation, the function of preventing rotation of the inner column 11 can be discharged and also the function of the stopper in the telescopic sliding operation can be discharged.

Further, the outer diameter of the large diameter portion 11c of the inner column 11 described above escapes from the universal joint 15, but is caused to contact with the inner surface of the outer jacket 1, so that the backlash of the column at the time of unclamping can be reduced and the operation can be performed smoothly. Also, at the time of clamping, under this contact condition being kept, it is possible to eliminate the backlash and to, resultantly, enhance the oscillation rigidity of the column since the inner column 11 and the outer jacket 1 are caused to abut on each other at multiple points at the time of clamping.

Further, when the outer diameter of the rear end portion 11a of the inner column 11 with respect to the vehicle body is set as smaller than the outer diameter of the middle portion 11b which is a portion to be clamped, the inner column 11 can be inserted into the outer jacket 1 from the frontal side of the vehicle to the rear side, whereby a comparatively great clearance can be provided with the outer jacket 1 and the inner column 11 can be installed easily.

Second Embodiment

Figure 7:
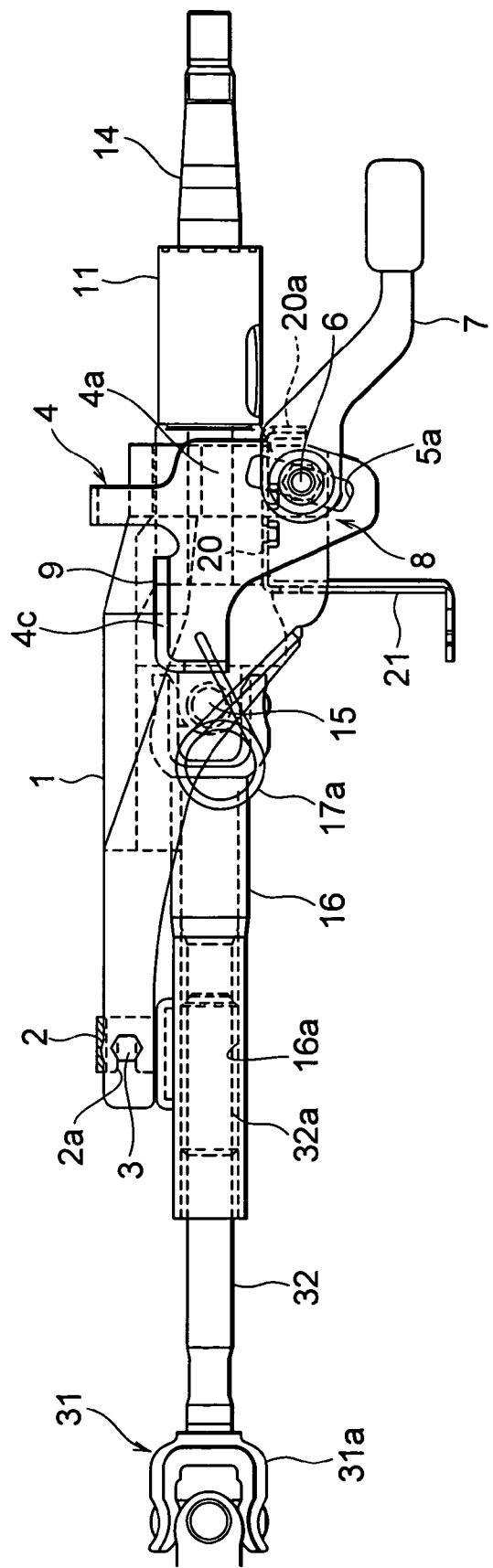
FIG. 7 is a side view of a tilt and/or telescopic type steering apparatus for a vehicle according to a second embodiment of the present invention.
Figure 8:
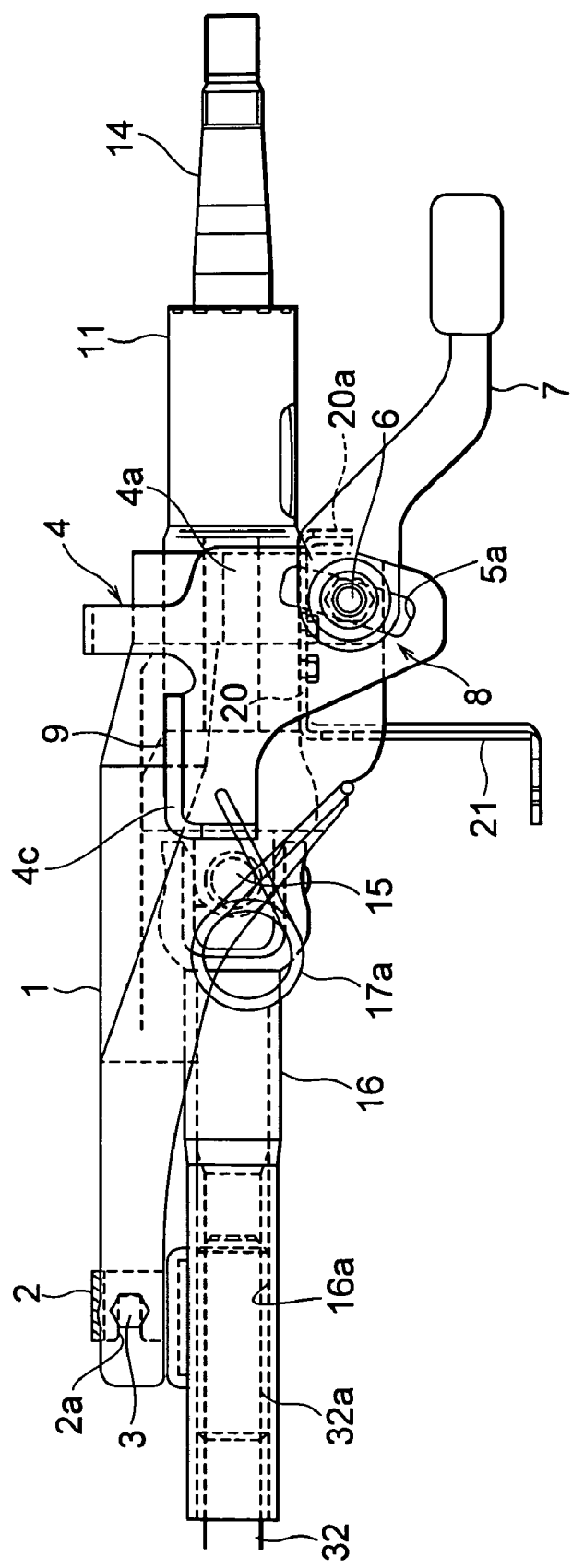
FIG. 8 is a side view of an essential portion of the tilt and/or telescopic type steering apparatus for a vehicle shown in FIG. 7.

FIG. 7 is a side view of a tilt and/or telescopic type steering apparatus for a vehicle according to a second embodiment of the present invention. FIG. 8 is a side view of an essential portion of the tilt and/or telescopic type steering apparatus for a vehicle shown in FIG. 7.

Figure 9:
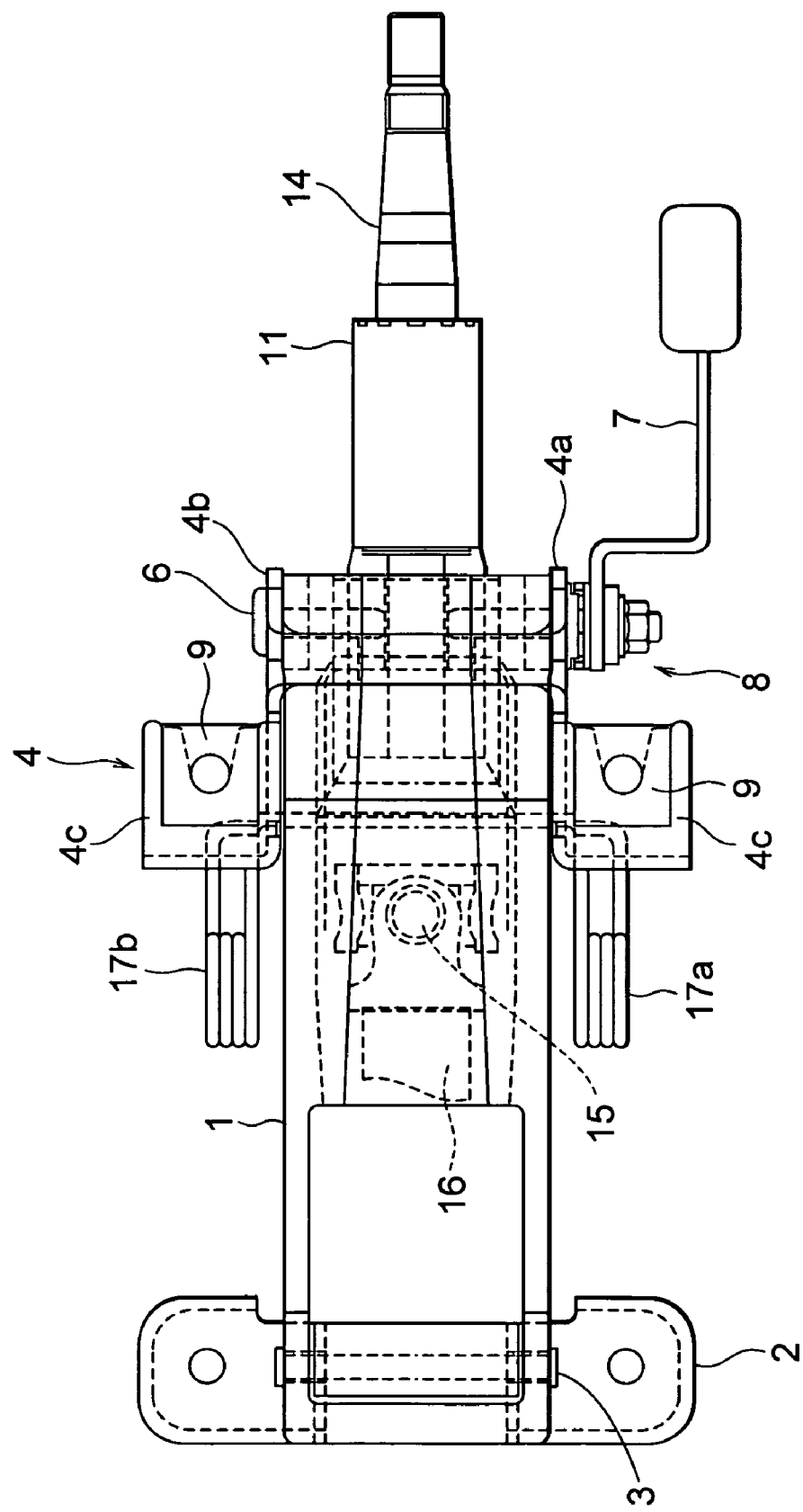
FIG. 9 is a plan view of the tilt and/or telescopic type steering apparatus for a vehicle shown in FIG. 7.
Figure 10:
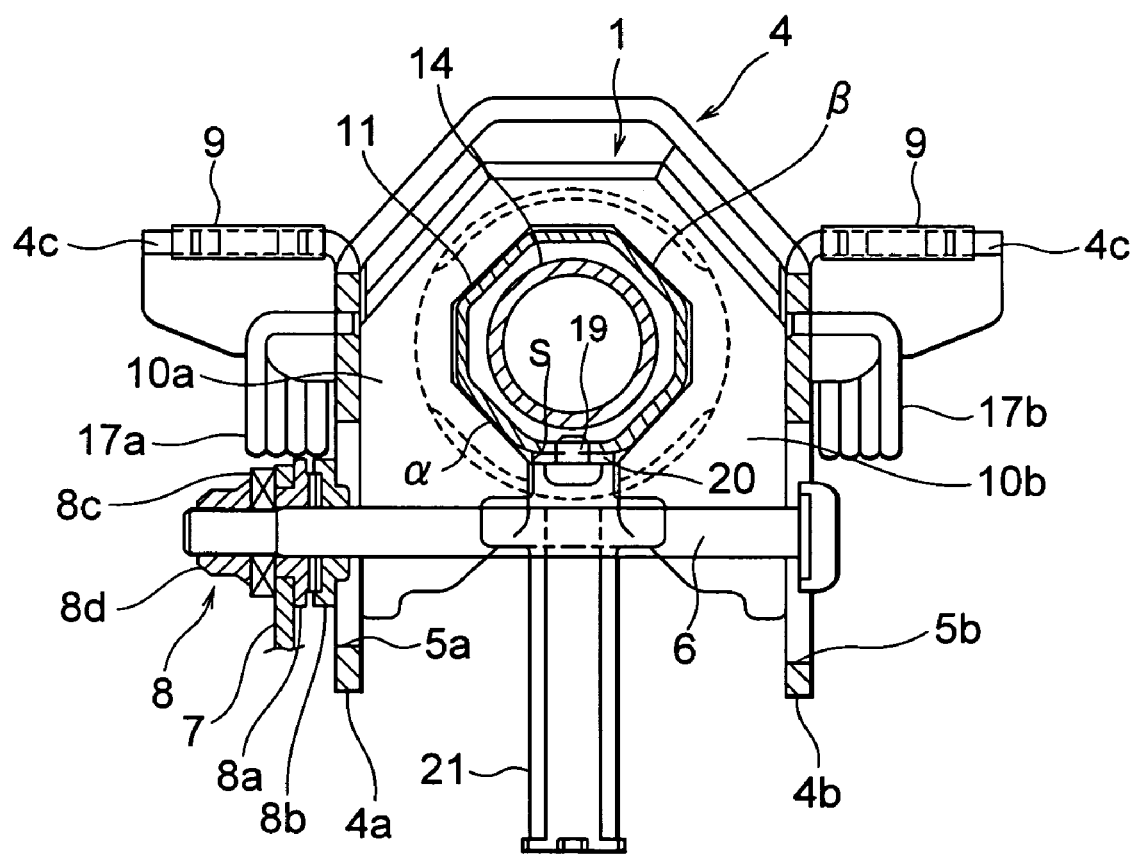
FIG. 10 is a transverse sectional view of the tilt and/or telescopic type steering apparatus for a vehicle shown in FIG. 7.

FIG. 9 is a plan view of the tilt and telescopic type steering apparatus for a vehicle shown in FIG. 7. FIG. 10 is a transverse sectional view of the tilt and telescopic type steering apparatus for a vehicle shown in FIG. 7.

In case of the second embodiment, as shown in FIG. 10, the inner column 11 is expanded into a non-circular deformed form and the inner diameter portions of the clamp portions 10a, 10b of the outer jacket 1 are also expanded into non-circular deformed forms correspondingly. As a result, it is possible to provide the main body of the inner column 11 with the function of preventing rotation and to distribute a component force uniformly in a vertical and horizontal directions. Thus, it is possible to improve the retaining force at telescopic clamping, or the like.

That is, the inner column 11 is expanded into an octagonal form and the clamp portions 10a, 10b of the outer jacket 1 are also expanded into octagonal forms correspondingly. With this arrangement, the clamping force by the clamping bolt 6 acts inwardly in the axial direction effectively, the clamping force on the inner column 11 acts vertically on each surface of the octagonal form, and further, the reaction force against the clamp potions 10a, 10b of the outer jacket 1 also acts on each surface of the octagonal form. As a result, it is possible to enhance the clamping force. Other arrangements and effects are the same as those in the foregoing embodiment, so that detailed description thereof will be omitted.

Also, the clamping bolt 6 is provided at a position which is shifted downward with respect to the central axis of the inner column 11.

Further, since the inner column 11 is formed to be octagonal, the outer diameter portion thereof has at least one set of flat surface portions which are opposite to each other in parallel. For example, in FIG. 10, the flat surface portions are denoted by α and β.

Further, to be corresponding to the flat surface portions of the inner column 11, the inner diameter portion of the outer jacket 1 also has one set of flat surface portions which are opposite to each other in parallel.

Third Embodiment

Figure 11:
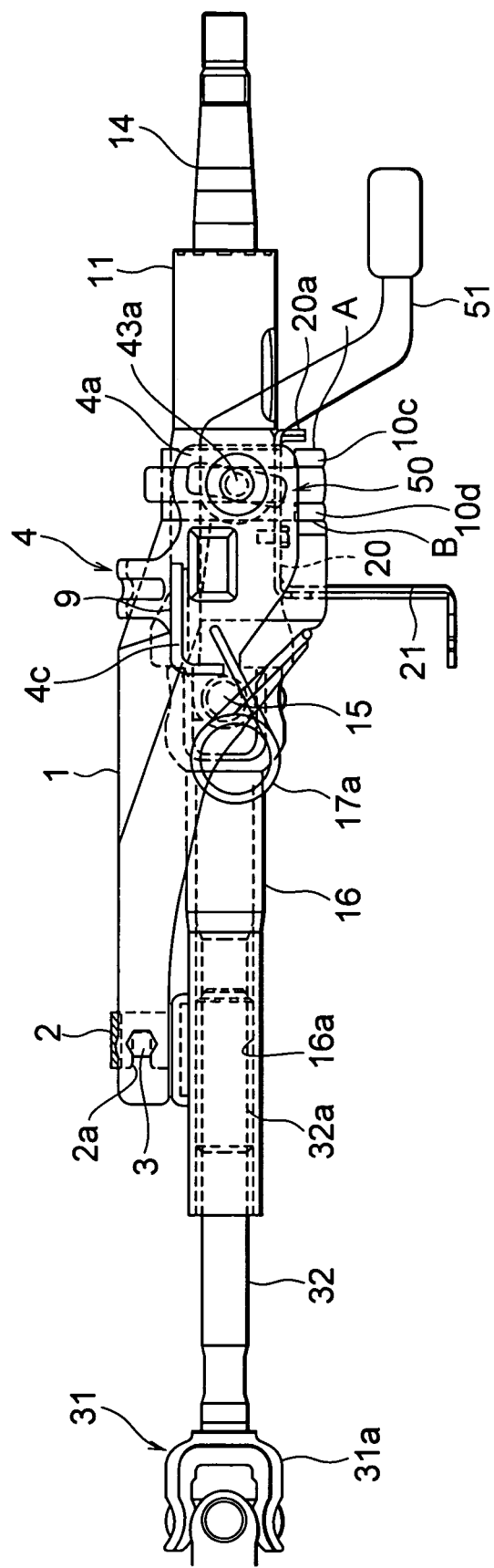
FIG. 11 is a side view of a tilt and/or telescopic type steering apparatus for a vehicle according to a third embodiment of the present invention.
Figure 12A:
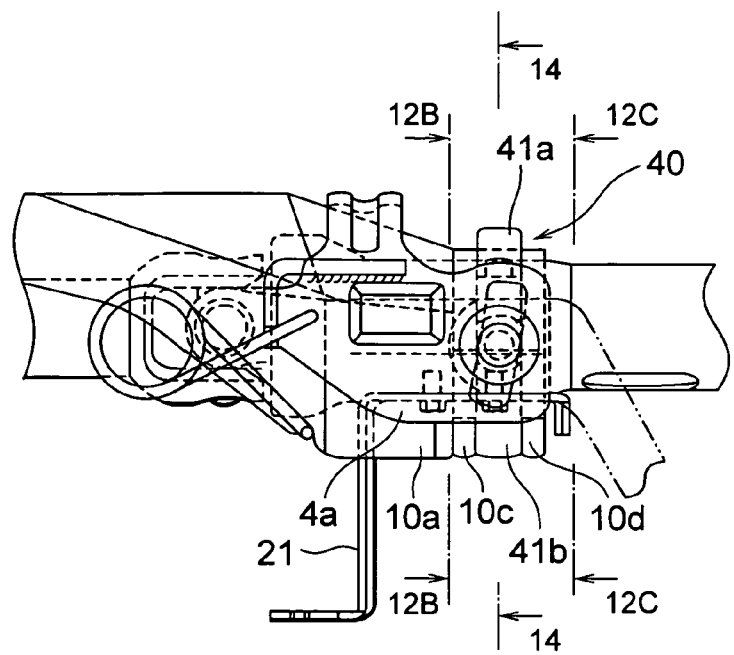
FIG. 12A is a side view of an essential portion of the tilt and/or telescopic type steering apparatus for a vehicle shown in FIG. 11.
Figure 12B:
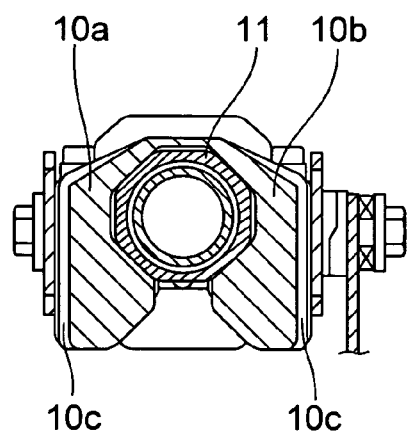
FIG. 12B is a transverse sectional view taken along the line 12B-12B in FIG. 12A.
Figure 12C:
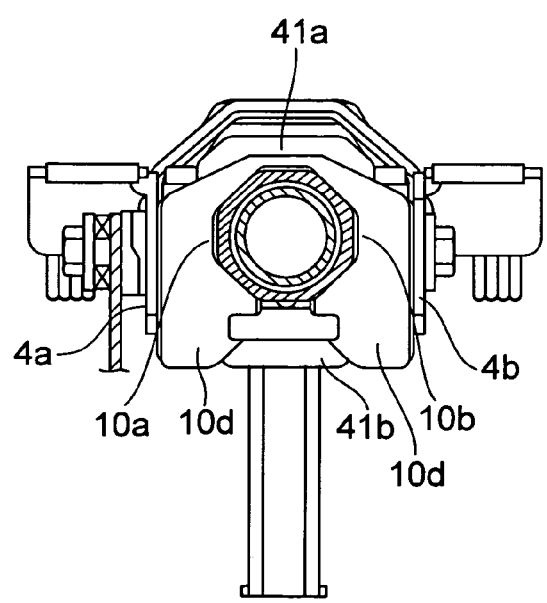
FIG. 12C is a transverse sectional view taken along the line 12C-12C in FIG. 12A.

FIG. 11 is a side view of a tilt and telescopic type steering apparatus for a vehicle according to a third embodiment of the present invention. FIG. 12A is a side view of an essential portion of the tilt and telescopic type steering apparatus for a vehicle shown in FIG. 11, FIG. 12B and FIG. 12C are transverse sectional views, taken along the line 12B-12B and the line 12C-12C in FIG. 12A, respectively.

Figure 13:
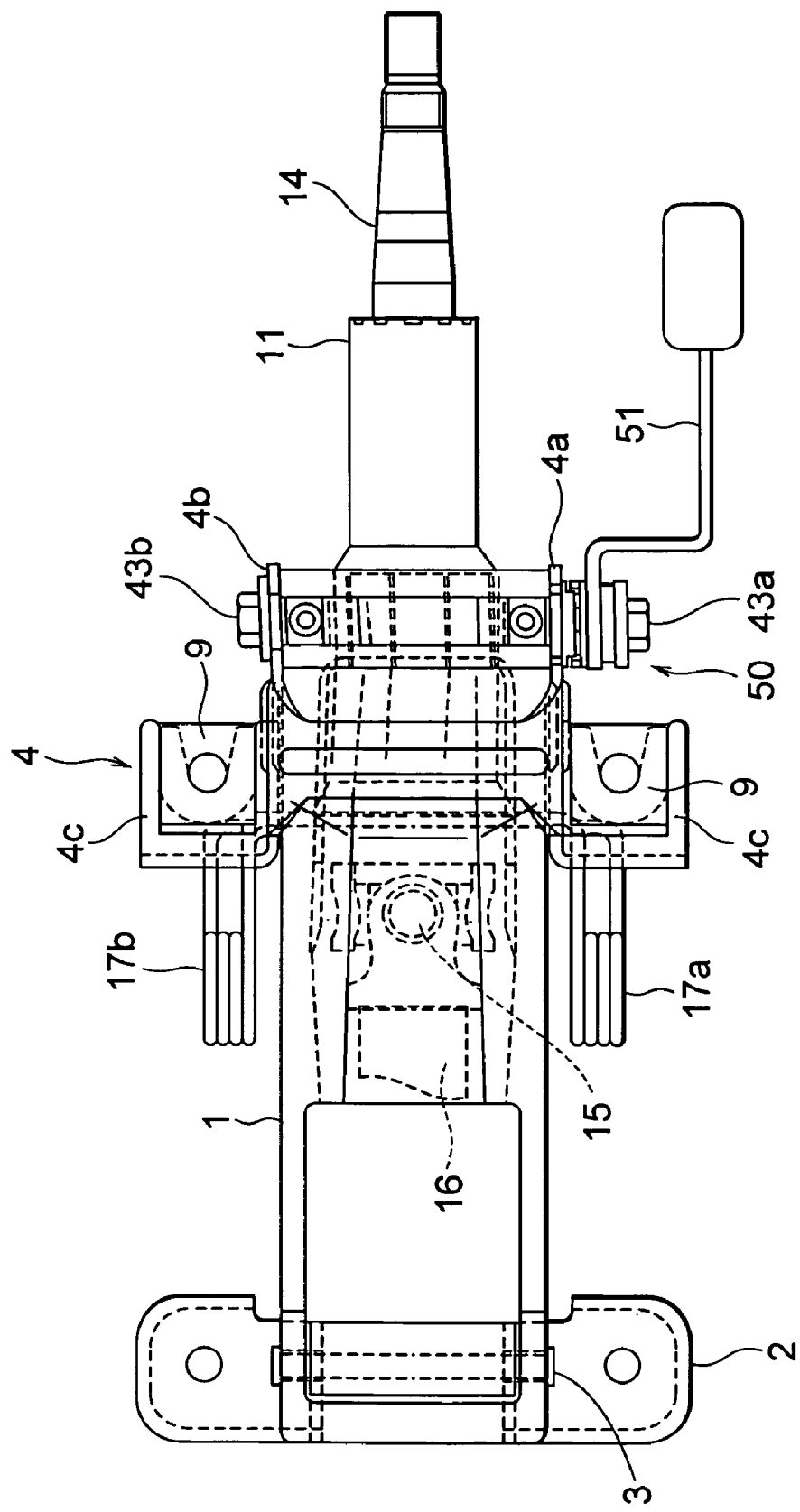
FIG. 13 is a plan view of the tilt and/or telescopic type steering apparatus for a vehicle shown in FIG. 11.

FIG. 13 is a plan view of the tilt and telescopic type steering apparatus for a vehicle shown in FIG. 11.

Figure 14:
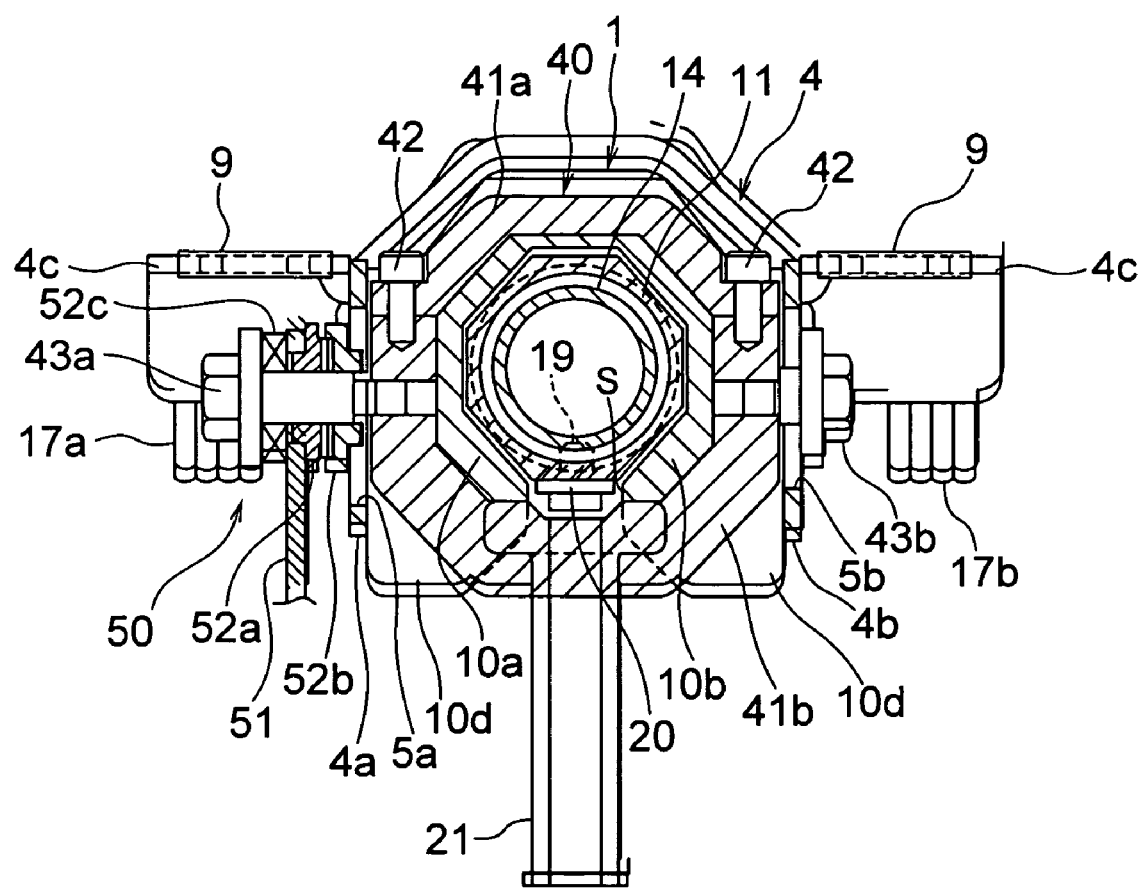
FIG. 14 is a transverse sectional view of the tilt and/or telescopic type steering apparatus for a vehicle shown in FIG. 11.
Figure 15:
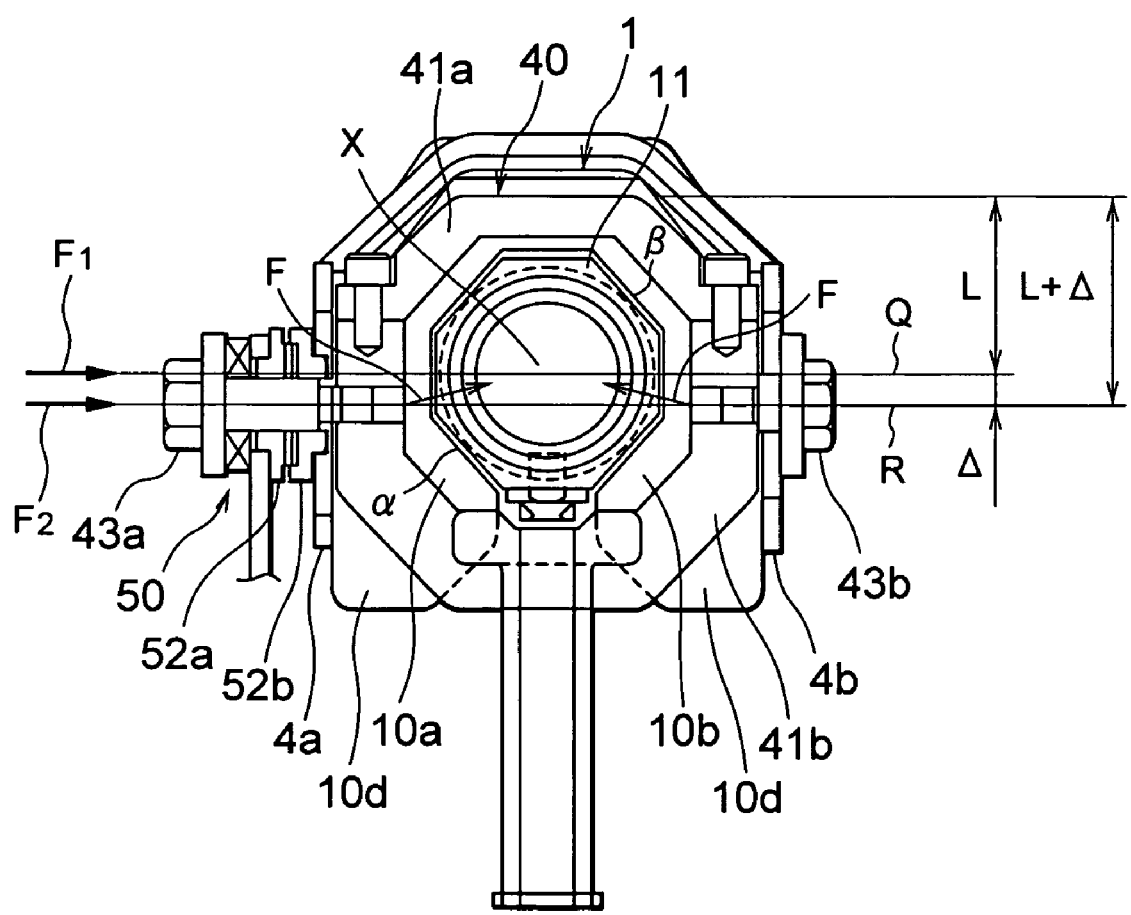
FIG. 15 is a transverse sectional view of the tilt and/or telescopic type steering apparatus for a vehicle shown in FIG. 11, for illustrating the function thereof.

FIG. 14 is a sectional view of the tilt and telescopic type steering apparatus for a vehicle shown in FIG. 12A, taken along the line 14-14. FIG. 15 is a transverse sectional view of a tilt and telescopic type steering apparatus for a vehicle shown in FIG. 11, for illustrating the function thereof.

In the third embodiment, an annular tension member 40 is provided on the outer periphery of the outer jacket 1 inside the body-side upper bracket 4. This tension member 40 is, as shown in FIG. 14, a member in a substantially annular form in its installed condition and is composed of two parts including an upper half part 41a and a lower half part 41b.

These upper and lower half parts 41a and 41b are integrated by clamping the bolt 42, thereby constituting the tension member 40. As described above, the tension member 40 is composed of two halves before assembling and the upper half part 41a and the lower half part 41b can be integrated by clamping the bolt 42 after the assembling. As a result, the tension member 40 can be assembled easily.

As shown in FIG. 12A, in front and behind of the tension member 40 with respect to the vehicle body, the clamp portions 10a, 10b of the outer jacket 1 each comprises a pair of U-shaped flanges 10c and 10d separated from each other in the back and forth direction of the vehicle. The flanges 10c and 10d are brought into pressure contact to be retained by the both side plates 4a and 4b of the body-side upper bracket 4 on both sides thereof in FIG. 14.

The annular tension member 40 described above is fitted in annular grooves which are formed on the paired flanges 10c and 10d of the clamp portions 10a and 10b in the back and forth direction of the vehicle.

As to the forms and the structures of the inner diameter sides of the clamp portions 10a, 10b and the outer periphery of the inner column 11, two inclined step portions are respectively provided, as in the first embodiment shown in FIG. 5B.

Similar to the foregoing embodiments, a slit S having a predetermined width is formed on the lower sides of the paired clamp portions 10a, 10b of the outer jacket 1 along the entire axial direction thereof.

A position of the inner column 11 corresponding to this slit S, the axial stopper member 20 for preventing rotation which is extended to pass through the slit S is fixed by a screw 19. The column cover attaching portion 21 is integrally formed with this axial stopper member 20 for preventing rotation to be extended downward therefrom.

Note that, as shown in FIGS. 11, 12A, 12B and 12C, the column cover attaching portion 21 and the bent portion 20a of the axial stopper member 20 for preventing rotation on the rear side with respect to the vehicle are respectively caused to abut upon the wall surfaces A and B (FIGS. 12A, 12B, 12C, etc.) at both ends of the flanges 10c, 10d of the outer jacket 1 in a telescopic sliding operation, so as to play the role of the axial stopper in the axial direction.

In FIG. 14, a bolt 43a through which a tilt adjusting groove 5a which is formed on the side plate 4a of the body-side upper bracket 4 is inserted is thread-engaged with a left portion of the lower half part 41b of the tension member 40. The cam and lock mechanism 50 is provided on this bolt 43a between the head portion of the bolt 43a and the side plate 4a through a washer and a thrust bearing 52c. On the other hand, a bolt 43b through which a tilt adjusting groove 5b which is formed on the side plate 4b of the body-side upper bracket 4 is inserted is thread-engaged with a right portion of the lower half part 41b of the tension member 40 to be fixed thereto. The washer is interposed between the head portion of the bolt 43a and the side plate 4b.

The cam and lock mechanism 50 is composed of a first cam member 52a which is rotated integrally with an operational lever 51 and a second cam member 52b which is engaged with the elongated hole 5a for tilt adjustment of the upper bracket 4 to be non-rotatable with respect to the upper bracket 4, and is moved in the axial direction while engaging with a convex part or a concave part of the first cam member 52a, to follow a rotation of the first cam member 52a, thereby effecting locking or unlocking.

The cam and lock mechanism 50 is loosened by operating the operational lever 51 whereby the bolts 43a, 43b are guided by the elongated holes 5a, 5b for tilt adjustment, whereby the tilt and/or telescopic adjustment can be effected.

In case of the present embodiment, as shown in FIG. 15, a horizontal line (R) which passes through the centers of the bolts 43a, 43b is shifted downward from another horizontal line (R) which passes through the center (X) of the inner column 11 only by A.

As the structure is arranged as described above, when the operational lever 51 is rotated for clamping to the tilt and/or telescopic adjustment position, in FIGS. 14 and 15, in the cam and lock mechanism 50, the first cam member 52a and the bolt 43a are moved to the left in the axial direction, while the second cam member 52b is moved to the right in the axial direction.

With this arrangement, the tension member 40 is pulled by the first cam member 52a and the bolt 43a to be moved to the left in the axial direction. As a result, the bolt 43b and the side plate portion 4b on the opposite side are moved to the left in the axial direction as if they were pulled by this tension member 40.

On the other hand, the side plate portion 4a is pressed by the second cam member 52b to be moved to the right in the axial direction.

Accordingly, both the side plate portions 4a, 4b are moved to close to each other, and resultantly press the paired flanges 10c, 10d in such a manner that both flanges 10c, 10d come close to each other. With this arrangement, the paired clamp portions 10a, 10b are clamped.

As a result, the inner column 11 is clamped by the paired clamp portions 10a, 10b and is clamped to the tilt and telescopic adjustment position.

On this occasion, since the clamp portions 10a, 10b of the outer jacket 1 are provided with a slit entirely along the axial direction according to the present embodiment, the whole outer jacket 1 can be easily flexed at the time of clamping, and the retaining force at the time of clamping can be enhanced.

Also, according to the present embodiment, since the annular tension member 40 is employed, an amount of protrusion of a lower side of the steering column can be reduced.

Further, in the present embodiment, as shown in FIG. 15, the horizontal line (R) which passes through the centers of the bolts 43a, 43b is shifted downward from the horizontal line (R) which passes through the center (X) of the inner column 11 only by Δ.

Accordingly, as shown in FIG. 15, a pair of pressing forces (F) act diagonally upward. As a result, a component force in the vertical direction works on the inner column 11. When this component force is Fv, the relation that $Fv=2 \times F \cdot \sin \theta$ is established. However, θ is an angle which is formed by and between the horizontal line (R) and the pressing force (F).

As described above, since the component force (Fv) also works, backlash of the inner column 11 can be suppressed even if the clamping force of the cam and lock mechanism 50 is not increased so much.

Also, assuming that the clamping force for clamping on the horizontal line (Q) is (F1) and the clamping force for clamping on the horizontal line (R) as in the present embodiment is (F2), the relation that $F2=F1 \cdot L/(L+\Delta)$ is established. Thus, since $L/(L+\Delta)$, it is possible to obtain a great clamping force only by effecting the smaller clamping force (F2) in accordance with the principle of leverage. As a result, it is possible to increase the retaining force (pressing force) of the inner column 11 even with a small clamping force.

Further, in the present embodiment, compared with the first and second embodiments described above, the cam and lock clamping mechanism 50 is provided substantially on a side of the inner column 11, and is not protruded downward from the inner column 11. As a result, an amount of downward protrusion of the inner column 11 can be reduced so that the inner column 11 can be made compact, whereby a large space around the knees of the crew can be secured.

Further, in the present embodiment, since the outer diameter portion of the inner column 11 is formed to be non-circular and deformed and the inner diameter portions of the clamp portions 10a, 10b of the outer jacket 1 are also formed to be non-circular and deformed correspondingly thereto, it is possible to provide the main body of the inner column 11 with the function of preventing rotation. It is also possible to distribute component forces of the clamping force in the vertical and horizontal directions evenly so as to enhance the retaining force at telescopic clamping, or the like.

That is, the outer diameter portion of the inner column 11 is formed to be octagonal and the inner diameter portions of the clamp portions 10a, 10b of the outer jacket 1 is also formed to be octagonal correspondingly thereto. With this arrangement, the clamping force acts inward in the axial direction effectively, the clamping force on the inner column 11 acts vertically on each surface of the octagon, and further the reaction force against the clamp portions 10a, 10b of the outer jacket 1 also acts vertically on each surface of the octagon, so that the clamping force can be enhanced.

Further, since the outer diameter portion of the inner column 11 is formed to be octagonal, this outer diameter portion has at least one set of flat surface portions which are opposed to each other in parallel. For example, the flat surface portions are denoted by α and β in FIG. 15.

Further, to be corresponding to the flat surface portions of the inner column 11, the inner diameter portion of the outer jacket 1 has also at least one set of flat surface portions which are opposed to each other in parallel.

Further, since the outer diameter portion of the outer jacket 1 is formed in an octagonal, non-circular and deformed form, the tension member 40 is also formed to be non-circular and deformed corresponding thereto. Also to be corresponding to the flat surface portions of the outer jacket 1, the inner diameter portion of the tension member 40 has also at least one set of flat surface portions which are opposed to each other in parallel.

Note that the present invention is not limited to the embodiments described above, but can be altered in various manners.

In the embodiments described above, it is arranged such that the inner column is provided on an upper side, while the outer jacket on a lower side. However, it may be arranged such that the inner column is provided on the lower side and the outer jacket on the upper side. Also in the embodiments described above, the slit is formed on a lower side of the outer jacket. However, it may be formed on an upper side thereof.

It is desirable that the paired side plates 4a, 4b of the upper bracket 4 have the same thickness.

As described above, according to the present invention, it is possible to enhance the retaining force at the time of clamping since the a slit is formed entirely along the axial direction of the outer jacket so that the whole outer jacket can be easily flexed at clamping.

Also according to the present invention, since a distance bracket which is used conventionally is no longer required, welding between the inner column and the distance bracket is becomes unnecessary. As a result, a telescopic operation becomes comparatively satisfactory and the steering column can be kept at high rigidity while the number of the constituent parts can be reduced.

The invention claimed is:

1. A steering apparatus for a vehicle comprising:
a body-side bracket attached to a body;
a column assembly supported by said body-side bracket and including an inner column for supporting a steering shaft to be rotatable and an outer jacket for supporting said inner column to be movable in an axial direction; and
telescopic clamping means for fixing the steering shaft at an adjustment position by clamping said inner column through said outer jacket,
wherein said outer jacket is provided with a slit formed through said outer jacket over an entire axial length of said outer jacket.

2. A steering apparatus for a vehicle according to claim 1, wherein the steering shaft is supported to be rotatable at least at two points in said inner column, and said steering shaft is extendable and contractible outside said inner column in the axial direction and on a lower side thereof.

3. A steering apparatus for a vehicle according to claim 2, wherein said inner column has a non-circular cross-section and an inner periphery of said outer jacket has a non-circular cross-section corresponding thereto.

4. A steering apparatus for a vehicle according to claim 2, wherein said inner column is provided with an axial stopper member for preventing rotation which is extended from said inner column to pass through said slit.

5. A steering apparatus for a vehicle according to claim 1, wherein said inner column has a non-circular cross-section and an inner periphery of said outer jacket has a non-circular cross-section corresponding thereto.

6. A steering apparatus for a vehicle according to claim 1, wherein said inner column is provided with an axial stopper member for preventing rotation which is extended from said inner column to pass through said slit.

7. A steering apparatus for a vehicle according to claim 1, wherein said outer jacket is pivotably connected at a lower end thereof to the vehicle body.

8. A steering apparatus for a vehicle according to claim 7, further comprising a body-side lower bracket, through which the lower end of said outer jacket is pivotably connected to the vehicle body.

9. A steering apparatus for a vehicle comprising:
an inner column for supporting a steering shaft to be rotatable;
an outer jacket for supporting said inner column at an outer peripheral side thereof;
a bracket attached to a vehicle body for supporting said outer jacket such that a position of said outer jacket is adjustable; and
a clamping mechanism for releasing a clamped state in which the position of said outer jacket is fixed to said bracket so as to allow position adjustment,
wherein said outer jacket has a portion for pressing and supporting said inner column at the outer peripheral side of said inner column, and
said outer jacket is provided with a slit formed through said outer jacket over an entire axial length of said outer jacket.

10. A steering apparatus for a vehicle according to claim 9, wherein:
the outer jacket has a retaining portion, with a minimum inner diameter portion for pressing and retaining the inner column at the outer peripheral side thereof, and an axially extending cylindrical inner diameter portion which is of larger diameter than said minimum inner diameter portion and which is connected to said retaining portion through an inclined step portion; and
said inner column comprises a cylindrical first outer diameter portion with a predetermined length which is partially pressed and supported by said minimum inner diameter portion of said outer jacket and which is extended in an axial direction to face said cylindrical inner diameter portion of said outer jacket, and a second outer diameter portion which is connected to said first outer diameter portion through an inclined step portion, is pressed and supported by said cylindrical inner diameter portion of said outer jacket, and has a diameter larger than that of said first outer diameter portion.

11. A steering apparatus for a vehicle according to claim 10, wherein:
said inner column supports the steering shaft at two points in the axial direction through bearings; and
a bearing on a lower side, out of said bearings, is provided at a lower end of said first outer diameter portion of said inner column.

12. A steering apparatus for a vehicle according to claim 9, wherein said outer jacket is pivotably connected at a lower end thereof to a vehicle body.

13. A steering apparatus for a vehicle according to claim 12, further comprising a body-side lower bracket, through which the lower end of said outer jacket is pivotably connected to the vehicle body.

14. A steering apparatus for a vehicle comprising:
a body-side bracket attached to a vehicle body;
a column assembly supported by said body-side bracket, said column assembly including
an inner column for supporting a steering shaft so as to be rotatable, and
an outer jacket for supporting said inner column so as to be movable in an axial direction; and
a telescopic clamping mechanism operable to fix the steering shaft at an adjustment position by clamping said inner column through said outer jacket,
wherein said outer jacket is provided with a slit formed through said outer jacket over an entire axial length of said outer jacket.

15. A steering apparatus for a vehicle according to claim 14, wherein the steering shaft is supported to be rotatable at least at two points in said inner column, and said steering shaft is extendable and contractible outside said inner column in the axial direction and on a lower side thereof.

16. A steering apparatus for a vehicle according to claim 14, wherein said inner column has a non-circular cross-section and an inner periphery of said outer jacket has a non-circular cross-section corresponding thereto.

17. A steering apparatus for a vehicle according to claim 14, wherein said inner column is provided with an axial stopper member for preventing rotation, which is extended from said inner column to pass through said slit.

18. A steering apparatus for a vehicle according to claim 14, wherein said outer jacket is pivotably connected at a lower end thereof to the vehicle body.

19. A steering apparatus for a vehicle according to claim 18, further comprising a body-side lower bracket, through which the lower end of said outer jacket is pivotably connected to the vehicle body.

* * * * *